(12) United States Patent
Xi et al.

(10) Patent No.: US 10,811,697 B2
(45) Date of Patent: Oct. 20, 2020

(54) FUEL CELLS, HALF PLATES, AND METHODS FOR DESIGNING THE SAME

(71) Applicant: GM GLOBAL TECHNOLOGY OPERATIONS LLC, Detroit, MI (US)

(72) Inventors: Liang Xi, Northville, MI (US); Jeffrey A. Rock, Rochester Hills, MI (US); Xi Yang, Bloomfield Hills, MI (US); Siguang Xu, Rochester Hill, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 270 days.

(21) Appl. No.: 16/018,578

(22) Filed: Jun. 26, 2018

(65) Prior Publication Data

US 2019/0393515 A1 Dec. 26, 2019

(51) Int. Cl.
*H01M 8/0247* (2016.01)
*H01M 8/0267* (2016.01)
*H01M 8/24* (2016.01)
*H01M 8/04746* (2016.01)
*H01M 8/1004* (2016.01)

(52) U.S. Cl.
CPC ....... *H01M 8/0247* (2013.01); *H01M 8/0267* (2013.01); *H01M 8/04746* (2013.01); *H01M 8/1004* (2013.01); *H01M 8/24* (2013.01)

(58) Field of Classification Search
None
See application file for complete search history.

(56) References Cited

U.S. PATENT DOCUMENTS

2016/0006044 A1* 1/2016 Hirata ................. H01M 8/2483
429/457

* cited by examiner

*Primary Examiner* — Wyatt P McConnell (57) ABSTRACT

Methods for designing one or a pair of half plates of a fuel cell include providing a first half plate defining a first half plate metal bead, wherein the first half plate metal bead protrudes from the first half plate forming a convex side, providing a second half plate defining a second plate metal bead, wherein the second half plate metal bead protrudes from the second half plate forming a convex side, determining a pressure profile between the convex sides of the first half plate metal bead and the second half plate metal bead in a compressed state, and adjusting a height of the first half plate metal bead and/or the second half plate metal bead in one or more locations to increase the uniformity of the pressure profile. Increasing the uniformity of the pressure profile can include reducing a range of the plurality of pressure measurements.

14 Claims, 5 Drawing Sheets

FUEL CELLS, HALF PLATES, AND METHODS FOR DESIGNING THE SAME

BACKGROUND

Fuel cell systems are increasingly being used as a power source in a wide variety of applications. Fuel cell systems have been proposed for use in power consumers such as vehicles as a replacement for internal combustion engines, for example. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The bipolar plates typically include two thin, facing metal sheets, or half-plates. One of the sheets defines a flow path on one outer surface thereof for delivery of the fuel to the anode of the MEA. An outer surface of the other sheet defines a flow path for the oxidant for delivery to the cathode side of the MEA. When the sheets are joined, the joined surfaces define a flow path for a dielectric cooling fluid. The plates are typically produced from a formable metal that provides suitable strength, electrical conductivity, and corrosion resistance, such as 316L alloy stainless steel for example.

The stack, which can contain more than one hundred plates, is compressed, and the elements held together by bolts through corners of the stack and anchored to frames at the ends of the stack. In order to militate against undesirable leakage of fluids from between the pairs of plates, a seal is often used. The seal is disposed along a peripheral edge of the pairs of plates. Prior art seals have included the use of an elastomeric material in conjunction with a bead stamped into the bipolar plate.

It would be desirable to produce a metal bead seal for sealing between plates of a fuel cell system, wherein the bead structure militates against a leakage of fluids from the fuel cell system and a cost thereof is minimized.

SUMMARY

Methods for designing a half plate of a fuel cell are provided. The methods include providing a half plate defining a metal bead, determining a pressure profile of the metal bead in a compressed state, and adjusting a height of the metal bead in one or more locations to increase the uniformity of the metal bead pressure profile. The pressure profile of the metal bead comprises a plurality of pressure measurements taken at different locations of the metal bead while in the compressed state. Increasing the uniformity of the metal bead pressure profile can include reducing a range of the plurality of pressure measurements. The compressed state of the metal bead is achieved via mechanical compression of the metal bead. The compressed state of the metal bead can be achieved via a finite element analysis simulation. Increasing the uniformity of the metal bead pressure profile can include reducing the height of the metal bead in locations which exhibited higher pressures in the compressed state relative to a mean pressure of the pressure profile, and/or increasing the height of the metal bead in locations which exhibited lower pressures in the compressed state relative to the mean pressure of the pressure profile. After adjusting the height of the metal bead in one or more locations to increase the uniformity of the metal bead pressure profile, the height of the metal bead in at least one region thereof can vary from an average height of the metal bead by at least about 3%.

Methods for designing a pair of half plates of a fuel cell are provide. The methods include providing a first half plate defining a first half plate metal bead, wherein the first half plate metal bead protrudes from the first half plate forming a convex side, providing a second half plate defining a second plate metal bead, wherein the second half plate metal bead protrudes from the second half plate forming a convex side, determining a pressure profile between the convex sides of the first half plate metal bead and the second half plate metal bead in a compressed state, and adjusting a height of the first half plate metal bead and/or the second half plate metal bead in one or more locations to increase the uniformity of the pressure profile. The pressure profile can be a plurality of pressure measurements taken between the convex sides of the first half plate metal bead and the second half plate metal bead at different locations while in the compressed state. Increasing the uniformity of the pressure profile can include reducing a range of the plurality of pressure measurements. The compressed state of the metal bead can be achieved by compressing the first half plate and the second half plate such that the convex sides of the first half plate metal bead and the second half plate metal bead are mated. The compressed state of the metal bead can be achieved via a finite element analysis simulation. Increasing the uniformity of the pressure profile can include reducing the height of the first half plate metal bead and/or the second half plate metal bead in locations which exhibited higher pressures in the compressed state relative to a mean pressure of the pressure profile, and/or increasing the height of the first half plate metal bead and/or the second half plate metal bead in locations which exhibited lower pressures in the compressed state relative to the mean pressure of the pressure profile. After adjusting the height of the first half plate metal bead and/or the second half plate metal bead in one or more locations to increase the uniformity of the pressure profile, the height of the metal bead in at least one region thereof can vary from an average height of each respective metal bead by at least about 3%.

Fuel cells are provided, and include a first half plate defining a first plate metal bead, wherein the first half plate metal bead protrudes from the first half plate forming a convex side, and a second half plate defining a second plate metal bead, wherein the second half plate metal bead protrudes from the second half plate forming a convex side. The convex side of the second plate metal bead can be mated with the convex side of the first plate metal bead, and one or more of first plate metal bead and the second plate metal bead can have a bead height which varies along a length of the metal bead. The one or more of first plate metal bead and the second plate metal bead can have a bead height which varies along the length of the metal bead prior to being mated with the other plate. The first plate metal bead and the second plate metal bead each can have a bead height which varies along the length of its respective metal bead. The first plate metal bead and the second plate metal bead each can have a bead height which varies along the length of its respective metal bead prior to being stacked mated with the other plate. An average height of the first plate metal bead and the second plate metal bead can be about 250 μm to about 1000 μm, and an average thickness of the first half plate and the second half plate can be about 50 μm to about 200 μm. The height of the first plate metal bead and/or the second plate metal bead can vary from an average height of the respective metal bead in at least one region by at least about 3%.

The present disclosure and its particular features and advantages will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
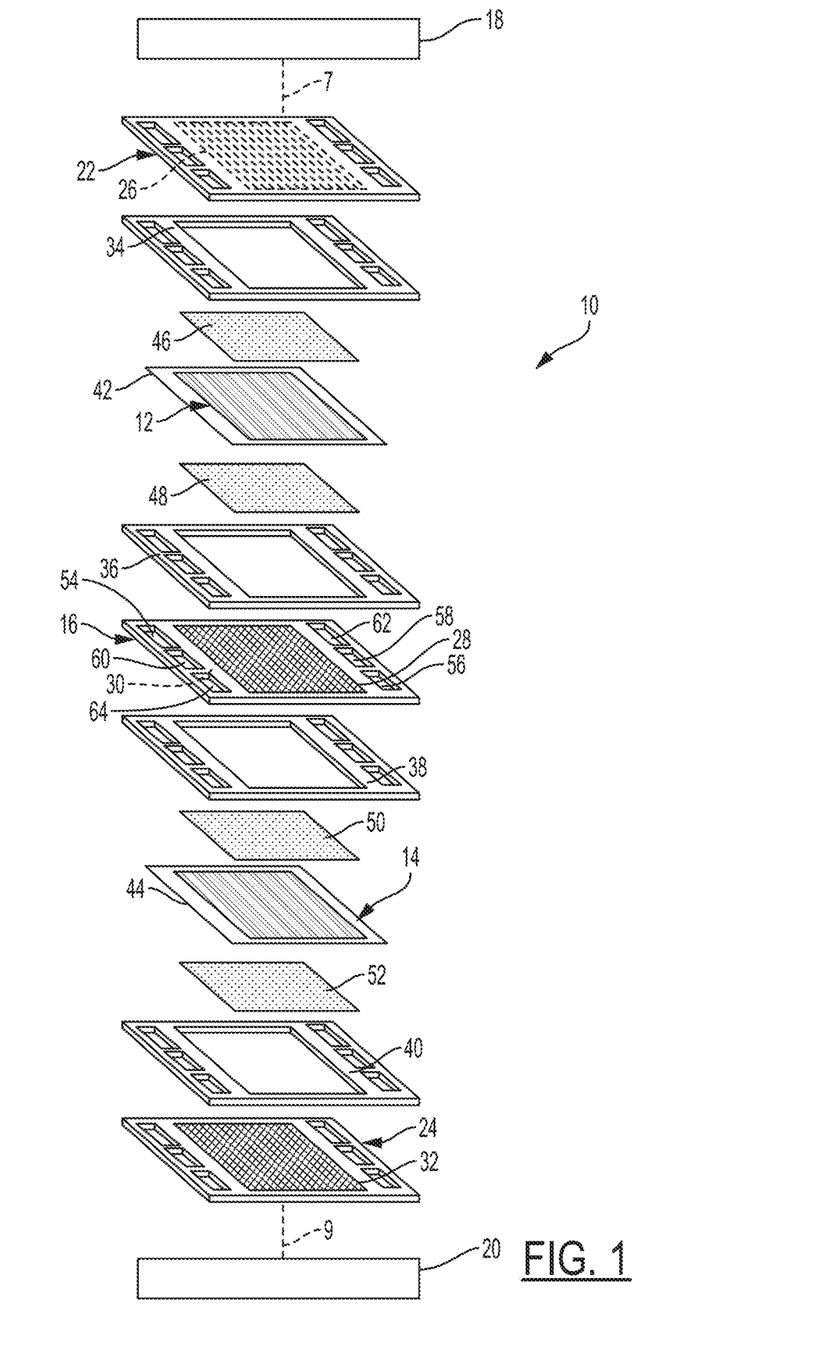
FIG. 1 illustrates an expanded view of a fuel cell stack, according to one or more embodiments.

FIG. 1 shows an illustrative bipolar PEM fuel cell stack 10. For simplicity, two-cells in the stack (i.e. three bipolar plates 16, 22, 24) are detailed in FIG. 1, it being understood that a typical stack will have many more such cells and bipolar plates. In some embodiments, unipolar plates are provided at both ends of the fuel cell stack where the unipolar plate includes the flow channels at a cathode side or anode side of the last fuel cell in the stack. While unipolar plates may differ slightly in structure for a given PEM fuel cell stack, reference to bipolar plates herein, including in the claims, is intended to include unipolar plates. It is further understood that elements 7 and 9 represent additional optional fuel cells within the fuel cell stack 10. Although a bipolar PEM fuel cell stack is shown, it is understood that other fuel cell types and configurations may also be used without departing from the scope and spirit of the disclosure.

The illustrative fuel cell stack 10 includes a first MEA 12 and a second MEA 14, each having an electrolyte membrane disposed between an anode electrode and a cathode electrode. An electrically conductive bipolar plate 16 is disposed between the first MEA 12 and the second MEA 14. The first MEA 12, the second MEA 14, and the bipolar plate 16 are stacked together between bipolar plates 22, 24 within the fuel cell stack 10. The clamping plates 18, 20 are electrically insulated from the bipolar plates in the stack. For example, a fuel cell stack 10 may have 30-400 plates, or more, as desired.

A bipolar plate generally includes two flow fields. A working face of each of the bipolar plates 22, 24, as well as both working faces of the bipolar plate 16, include a flow field, labeled 26, 32, and 28 and 30, respectively. The flow fields (e.g., 26, 28, 30, 32) include a plurality of flow channels and distribute reactants such as hydrogen and oxygen/air over the faces of the MEAs 12, 14. For example, a given bipolar plate may have about 10-50 flow channels, or more as desired.

Nonconductive gaskets 34, 36, 38, 40 may be respectively disposed between the bipolar plate 22 and the first MEA 12, the first MEA 12 and the bipolar plate 16, the bipolar plate 16 and the second MEA 14, and the second MEA 14 and the bipolar plate 24. The gaskets 34, 36, 38, 40 facilitate a seal and electrically insulate the end plate 22 and the first MEA 12, the first MEA 12 and the bipolar plate 16, the bipolar plate 16 and the second MEA 14, and the second MEA 14 and the bipolar plate 24.

The MEAs 12, 14 of the illustrative fuel cell stack 10 may have nonconductive subgaskets or barrier films 42, 44. The subgaskets 42, 44, either alone or employed in conjunction with the gaskets 34, 36, 38, 40, extend from the edges of the electrodes and facilitate a seal of the first MEA 12 and the bipolar plate 16 and the bipolar plate 16 and the second MEA 14. The subgaskets 42, 44 also electrically insulate the first MEA 12 and the bipolar plate 16, and the bipolar plate 16 and the second MEA 14. As a non-limiting example, the subgaskets 42, 44 may be formed respectively integral with the nonconductive gaskets 34, 36, 38, 40. The subgaskets 42, 44 may also be formed integrally with the electrolyte membrane. In other embodiments, the subgaskets 42, 44 are formed from another suitable, electrically nonconductive material and coupled to the MEAs 12, 14, respectively. Collectively, the MEAs 12, 14, the gaskets 34, 36, 38, 40, and the subgaskets 42, 44 are known as fuel cell "softgoods" or "softgood layers."

Gas-permeable DM 46, 48, 50, 52 abut respective electrodes of the first MEA 12 and the second MEA 14. The DM 46, 48, 50, 52 are respectively disposed between the bipolar plate 22 and the first MEA 12, the first MEA 12 and the bipolar plate 16, the bipolar plate 16 and the second MEA 14, and the second MEA 14 and the bipolar plate 24.

The bipolar plates 16, 22, 24, and the gaskets 34, 36, 38, 40 each include a plurality of apertures, including a cathode supply aperture 54 and a cathode exhaust aperture 56, a coolant supply aperture 58 and a coolant exhaust aperture 60, and an anode supply aperture 62 and an anode exhaust aperture 64. Each of the foregoing apertures can represent one or a plurality of apertures; for example, the cathode supply aperture 54 and/or the anode supply aperture can represent two apertures, in some embodiments. The number of apertures relating to cathode, anode, and coolant may vary based on design constraints and/or objectives, as will be known by one of skill in the art. Supply manifolds and exhaust manifolds of the fuel cell stack 10 are formed by an alignment of the respective apertures 54, 56, 58, 60, 62, 64 in the bipolar plates 16, 22, 24, and the gaskets 34, 36, 38, 40. The hydrogen gas is supplied to an anode supply manifold via an anode inlet conduit (not shown). The air is supplied to a cathode supply manifold of the fuel cell stack 10 via a cathode inlet conduit (not shown) at end plate 18. An anode outlet conduit and a cathode outlet conduit are also provided for an anode exhaust manifold and a cathode exhaust manifold, respectively. A coolant inlet conduit (not shown) is also provided at end plate 18 for supplying liquid coolant to a coolant supply manifold. A coolant outlet conduit (not shown) may also be provided at end plate 18 for removing coolant from a coolant exhaust manifold.

Figure 2:
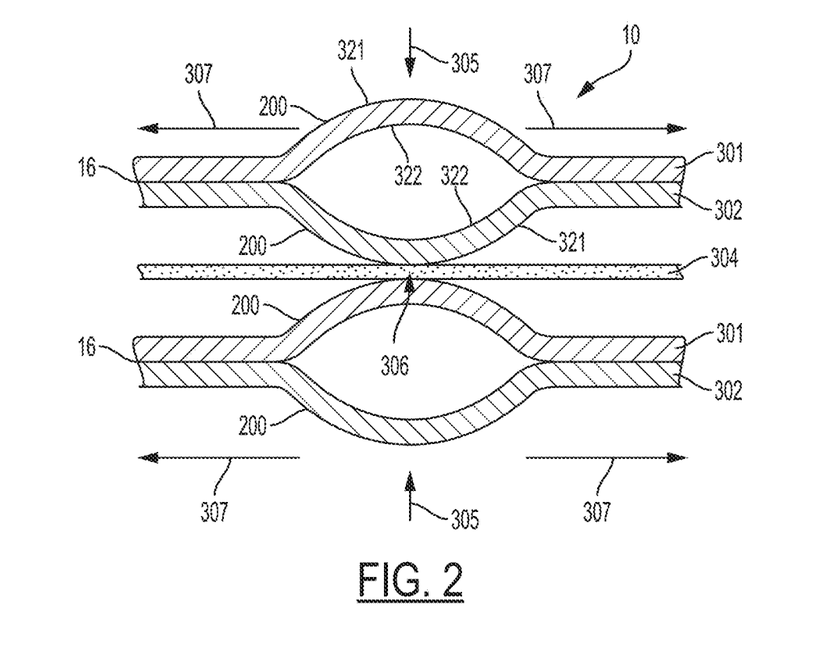
FIG. 2 illustrates a cross-sectional view of a metal bead seal in a fuel cell, according to one or more embodiments.

With reference to FIG. 2, each of the pair of traditional bipolar plates 16 is formed from a first half-plate 301 and a second half-plate 302, wherein each half-plate has a first side 321 and a second side 322. The first half-plate 301 is joined to the second half-plate 302 such that the second sides 322 of each half-plate are contiguous. The joined first and second half-plates 301, 302 form internal channels (not shown) adjacent the flow field 28, 30 (FIG. 1) of each of the pair of bipolar plates 16 for coolant to flow therethrough for temperature regulation of the illustrative fuel cell stack 10. The first and second half-plates 301, 302 may be joined by at least one of a variety of suitable means known in the art, such as by welding or by an application of an adhesive, for example. Other suitable means for joining the first half-plate 301 with the second half-plate 302 may be selected as desired.

Figure 4A:
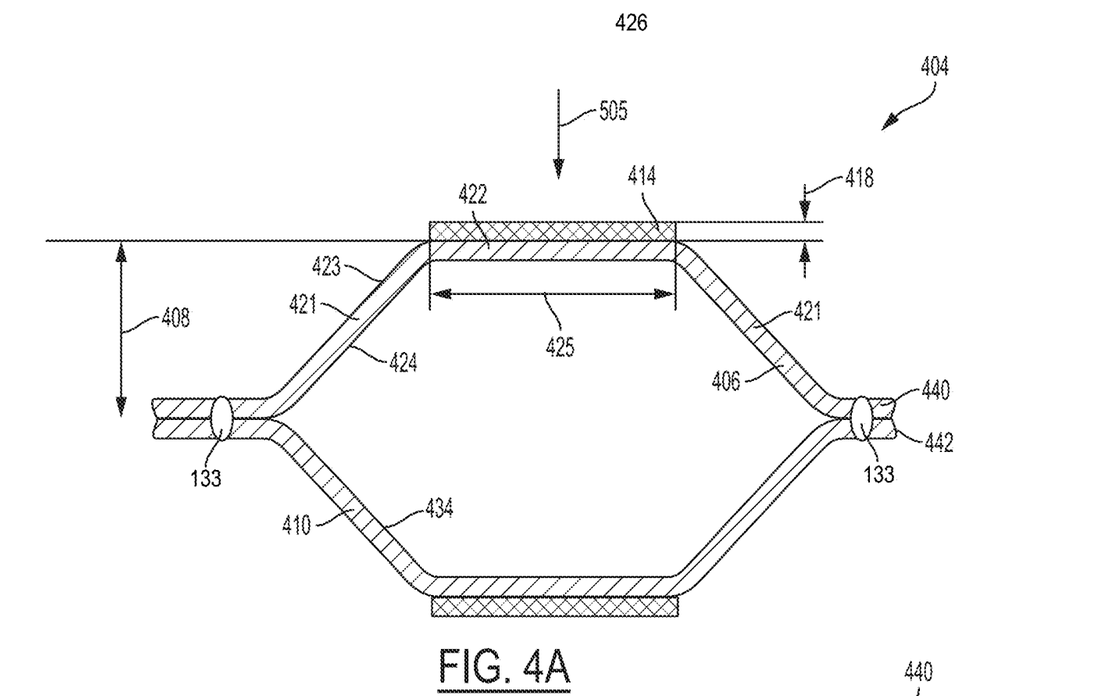
FIG. 4A illustrates a cross-sectional, partial view of a bipolar plate proximate to a metal bead, according to one or more embodiments.

The bipolar plates 16, 22, 24 of the traditional fuel cell stack 10 have a softer layer 304 such as at least one of the gaskets 34, 36, 38, 40 and the subgaskets 42, 44, for example, disposed between each bipolar plate 16, 22, 24. The single bead 200 shown is formed on each of the pair of bipolar plates 16, 22, 24. The single bead 200 has a substantially arcuate surface as shown in FIG. 2, although other geometric configurations are practicable. As a non-limiting example, the single bead 200 may be formed by a stamping operation performed on the first and second half-plates 301, 302. The single beads 200 of each of the pair of bipolar plates 16 sandwich the softer layer 304 when the fuel cell stack 10 is placed in the compressed state. In the compressed state, contact between the single beads 200 forms a seal 306. Softer layer 304 can also be referred to as a microseal. A microseal may comprise a thickness (e.g., thickness 418 as shown in FIG. 4A) of about 0.01 mm to about 0.3 mm, about 0.02 to about 0.2 mm, or about 0.03 to about 0.15 mm. A microseal may comprise a thickness of up to about 0.3 mm, up to about 0.2 mm, or up to about 0.1 mm. A microseal may comprise an elastomeric material. Suitable elastomeric materials can comprise one or more of EPDM (Ethylene propylene diene monomer), HNBR (Hydrogenated acrylonitrile-butadiene), NBR (acrylonitrile butadiene), VMQ (silicone), FVMQ (fluorosilicone), and FKM (fluoropolymer), among others. A microseal can be applied via screen printing, for example.

However, as compression loads 305 (FIG. 2) are applied to the single beads of the fuel cell, the beads have a tendency to flatten given both the top and bottom plates move laterally along the lateral direction 307 as shown in FIG. 2 as the bead absorbs energy from the compression loads 305. The flattening deformation in the traditional bead of FIG. 2 may therefore compromise the fluid tight seal 306 between two bipolar plates.

Figure 3:
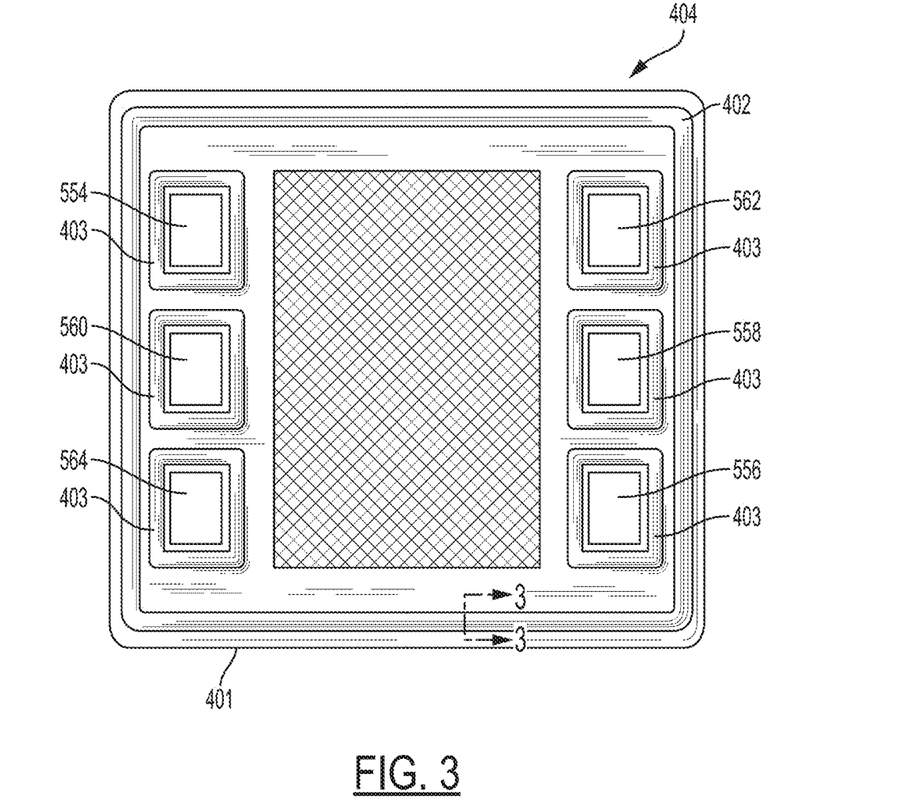
FIG. 3 illustrates a plan view of a bipolar plate, according to one or more embodiments.

An example bipolar plate 404 of the present disclosure is shown in FIG. 3 in further detail. The bipolar plate 404 includes a plurality of metal bead seals formed thereon, including a peripheral metal bead seal 402, and a plurality of aperture metal bead seals 403. The peripheral metal bead seal 402 is typically formed on the bipolar plate 404 adjacent or proximate to the peripheral or outer edge 401 (FIG. 3) thereof. The plurality of aperture metal bead seals 403 are each disposed proximate or adjacent to a respective aperture location. Each aperture of bipolar plate 404 (e.g., 554, 556, 558, 560, 562, 564) occurs at a unique corresponding aperture location.

Each metal bead seal comprises two metal beads from two half-plates. FIG. 4A illustrates a bipolar plate 404 comprising a first half-plate 440 comprising a bead 406 and a second half-plate 442 comprising a bead 410, which generally form a metal bead seal. Bead 406 and 410 are shown as generally symmetrical, but asymmetric beads are within the scope of this disclosure. Further, bead 406 and 410 are illustrated as trapezoidal beads. As used herein, "trapezoidal" refers to a bead with two angled walls 421 connecting to a central top portion. As shown in FIG. 4A, the central top portion 422 is shown as substantially flat, but trapezoidal beads may also include central top portions which are concave or convex (e.g., curved concave or curved convex portions). The metal beads described herein may be of varying geometries not limited to those described in FIGS. 2, and 4A-B. In a particular embodiment, each half-plate, described in relation to half-plate 440, comprises a bead 406 defined by a substantially flat portion 422 and two side walls 421, which collectively protrude from the half-plate 440 and define a first, convex side 423 and a second, concave side 424 of the bead 406. In other embodiments, flat portion 422 can be convex or concave, as desired. The flat portion 422 is proximate a central portion of the bead 406 at which the height 408 of the bead is maximum. The flat portion 422 can have a length 425, which is generally not greater than the length 426 of the bead 406.

Figure 4B:
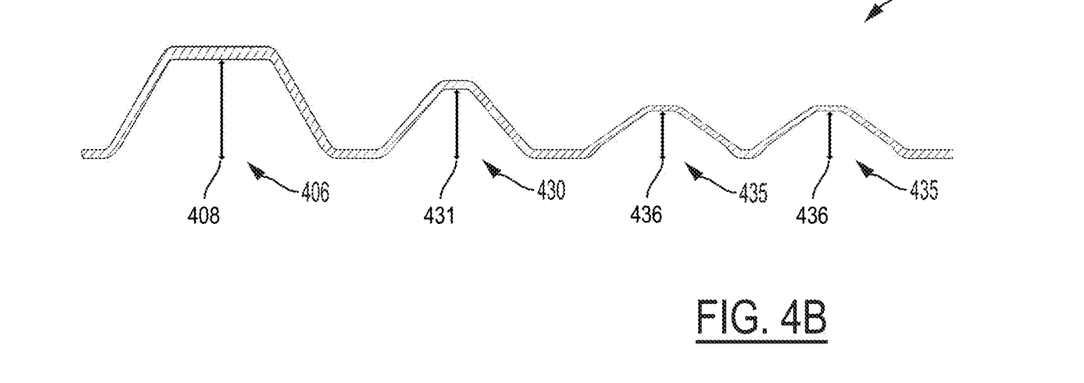
FIG. 4B illustrates a cross-sectional side view of a half-plate, according to one or more embodiments.

FIG. 4B illustrates a cross-sectional side view of a portion of the half-plate 440 comprising bead 406, a compression limiter 430, and two flow channels 435. A half-plate, such as half-plate 440, may have more or less beads 406, compression limiters 430, and flow channels 435 as desired. The compression limiter 430 has a height 431 which is less than the bead height 408 and greater than the height of the flow channels 436. In some embodiments, a plurality of flow channels 435 may have varying heights, but all such heights will be less than compression limiter height 431.

Figure 5:
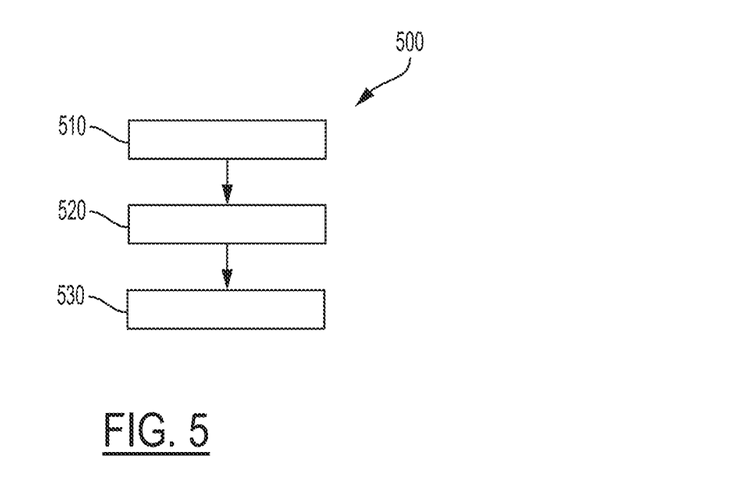
FIG. 5 illustrates a block diagram of a method for designing one or more half plates of a fuel cell, according to one or more embodiments.

In a fuel cell stack (e.g., fuel cell stack 10 from FIG. 2), the convex sides of two metal beads from adjacent bipolar plates are mated to form a seal (e.g., the seal 306 between adjacent half plates 302 and 301 and softer layer 304 from FIG. 2) Non-uniformities of the pressure profile between the mated metal beads can result in leaking or other performance issues proximate to the seal (e.g., seal 306 of FIG. 2). Accordingly, FIG. 5 illustrates a block diagram of a method 500 for designing a half plate (e.g., an anode or a cathode) of a fuel cell. The method 500 for designing a half plate of a fuel cell comprises providing 510 a half plate (e.g., an anode or a cathode) defining a metal bead, determining 520 a pressure profile of the metal bead in a compressed state, and adjusting 530 a height of the metal bead in one or more locations to increase the uniformity of the metal bead pressure profile.

The compressed state of the metal bead can be achieved via mechanical compression of the metal bead, for example. A material which is deformable by pressure may be positioned between two metal beads during compression in order to measure a pressure profile by taking a plurality of pressure measurements taken at different locations of the metal bead while in the compressed state, or allowing a plurality of pressure measurements to be determined through study of the material after compression. Such materials include pressure sensitive paper or film, a plastically deformable metal comprising an array of raised dots (e.g., fabricated via photoetching), or metal or plastic grid-shaped material (e.g., formed from wires or rod materials with round cross sections), among many other options. In some embodiments, a pressure profile can be determined via birefringence stress testing using a clear mating part. In other embodiments, a leak-testing (e.g., using sensors or soap), and/or visual post-test observation of gross buckling and/or damage to soft parts can be used to determine a pressure profile. Additionally or alternatively, the compressed state of the metal bead can be achieved by a computer simulation technique, such as finite element analysis and beam theory analytics. The pressure profile of the metal bead is a plurality of pressure measurements taken at different locations along the metal bead while in the compressed state. Increasing the uniformity of the metal bead pressure profile can include reducing the range of the plurality of pressure measurements, for example. Additionally or alternatively, increasing the uniformity of the metal bead pressure profile can include improving the metal bead seal performance above a minimum threshold while the bead seal is beneath a buckling load. The buckling load can be defined as the load at which the metal bead seal deforms to such an extent that it is no longer able to form a sufficient seal.

In one embodiment, the uniformity of the metal bead pressure profile can be increased by reducing the height of the metal bead in locations which exhibited higher pressures in the compressed state relative to the mean pressure of the pressure profile. In one embodiment, the uniformity of the metal bead pressure profile can be increased by increasing the height of the metal bead in locations which exhibited lower pressures in the compressed state relative to the mean pressure of the pressure profile. In one embodiment, the uniformity of the metal bead pressure profile can be increased by reducing the height of the metal bead in locations which exhibited higher pressures in the compressed state relative to the mean pressure of the pressure profile, and increasing the height of the metal bead in locations which exhibited lower pressures in the compressed state relative to the mean pressure of the pressure profile.

FIG. 5 similarly illustrates a block diagram of a method 500 for designing a pair of half plates of a fuel cell, comprising providing 510 a first half plate (e.g., an anode) defining a first half plate metal bead, and providing 510 a second half plate (e.g., a cathode) defining a second plate metal bead. The metal bead of the first half plate and second half plate each protrude from the respective half plates and form a convex side. Each convex side (e.g., convex side 423 of half plate 440) defines a maximum height (e.g., height 408 as shown in FIG. 4) of the metal bead. Method 500 further comprises determining 520 a pressure profile between the convex sides of the first half plate metal bead and the second half plate metal bead in a compressed state, and adjusting 530 a height of the first half plate metal bead and/or the second half plate metal bead in one or more locations to increase the uniformity of the pressure profile. The compressed state of the metal bead can be achieved by compressing the first half plate and the second half plate such that the convex sides of the first half plate metal bead and the second half plate metal bead are mated, for example. Additionally or alternatively, the compressed state of the metal bead can be modeled by a computer simulation technique, such as finite element analysis. The pressure profile comprises a plurality of pressure measurements taken between the convex sides of the first half plate metal bead and the second half plate metal bead at different locations while in the compressed state. Increasing the uniformity of the pressure profile can include reducing the range of the plurality of pressure measurements, for example.

Because increasing the uniformity of the pressure profile of one metal bead can impact the performance of other metal bead seals in a common fuel cell stack, method 500 can be performed iteratively on one or more metal bead seals in a fuel cell stack. Accordingly, method 500 also includes increasing the uniformity of a pressure profile of one metal bead in a metal bead seal in order to improve the performance of a different metal bead or other metal bead seal.

In one embodiment, the uniformity of the metal bead pressure profile can be increased by reducing the height of the first half plate metal bead and/or the second half plate metal bead in locations which exhibited higher pressures in the compressed state relative to the mean pressure of the pressure profile. In one embodiment, the uniformity of the metal bead pressure profile can be increased by increasing the height of the first half plate metal bead and/or the second half plate metal bead in locations which exhibited lower pressures in the compressed state relative to the mean pressure of the pressure profile. In one embodiment, the uniformity of the metal bead pressure profile can be increased by reducing the height of the first half plate metal bead and/or the second half plate metal bead in locations which exhibited higher pressures in the compressed state relative to the mean pressure of the pressure profile, and increasing the height of the first half plate metal bead and/or the second half plate metal bead in locations which exhibited lower pressures in the compressed state relative to the mean pressure of the pressure profile. The height of the first half plate metal bead and the second half plate metal bead can be adjusted by the same or different amounts. In one embodiment, the height of the first half plate metal bead can be increased and the height of the second half plate metal bead can be decreased, such that the collective height change of both metal beads is adjusted as desired (i.e., the collective height is increased if the measured pressure that the region of height variation is below the mean pressure for the pressure profile, or the collective height is decreased if the measured pressure that the region of height variation is above the mean pressure for the pressure profile.)

Method 500 can be utilized to design a fuel cell which comprises a first half plate defining a first plate metal bead, and a second half plate defining a second plate metal bead. The metal bead of the first half plate and second half plate each protrude from the respective half plates and form a convex side. Each convex side (e.g., convex side 423 of half plate 440) defines a maximum height (e.g., height 408 as shown in FIG. 4) of the metal bead. The convex side can be flat on one or more sides, and/or rounded, for example. The convex side of the second plate metal bead is mated with the convex side of the first plate metal bead, and one or more of first plate metal bead and the second plate metal bead has a bead height which varies along the length of the metal bead. The first plate metal bead and the second plate metal bead can each have a bead height which varies along the length of its respective metal bead.

One or more of first plate metal bead and the second plate metal bead can have a bead height which varies along the length of the metal bead prior to being mated with the other plate. The first plate metal bead and the second plate metal bead can each have a bead height which varies along the length of its respective metal bead prior to being stacked mated with the other plate. The average height of the first plate metal bead and the second plate metal bead can be about 250 µm to about 1000 µm, and the average thickness of the first half plate and the second half plate can be about 50 µm to about 200 µm, for example. The height of the first plate metal bead and/or the second plate metal bead can vary from the average height of the respective metal bead in at least one region by at least about +/−2%, at least about +/−3%, or at least about +/−6%.

EXAMPLE 1

Figure 6:
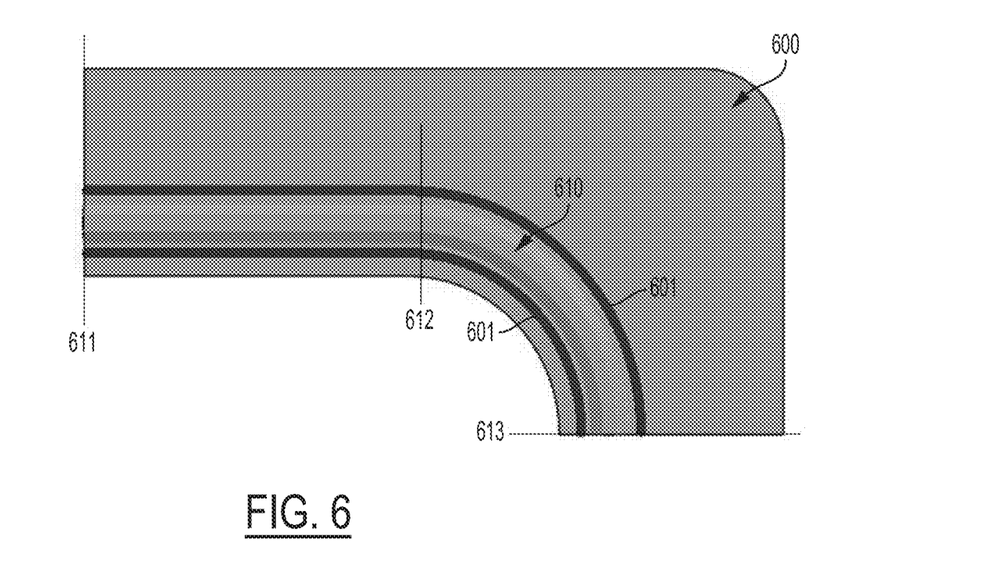
FIG. 6 illustrates a partial top view of a half plate comprising a metal bead, according to one or more embodiments.

The heights of metal beads having otherwise identical geometries were varied to determine the efficacy of method 500 in increasing pressure profile uniformity. FIG. 6 illustrates a top view of a half plate 600 comprising a metal bead 610. Half plate 600 was welded to an analogous half plate to form a bipolar plate at weld lines 601. The metal bead had a uniform height of 490 µm. The metal bead 610 was compressed to a height of 370 µm and then fully unloaded in a finite element analysis model. At an average bead pressure unloading of 1.65 Mpa, the metal bead 610 exhibited a pressure of 0.85 MPa at position 611, a pressure of 2.88 MPa at position 613, and the total pressure profile of metal bead 610 had a range of 2.04 MPa.

A second half plate 600 comprised a metal bead with a height of 505 µm at position 611, a height of 490 µm at position 612, and a height of 475 µm at position 613. The metal bead 610 was compressed to a height of 370 µm and then unloaded. At an average bead pressure unloading of 1.65 Mpa, the metal bead 610 exhibited a pressure of 0.90 MPa at position 611, a pressure of 2.64 MPa at position 613, and the total pressure profile of metal bead 610 had a range of 1.73 MPa. These results show that varying the height of the metal bead 610 improves the pressure profile uniformity thereof A third half plate 600 comprised a metal bead with a height of 520 µm at position 611, a height of 490 µm at position 612, and a height of 460 µm at position 613. The metal bead 610 was compressed to a height of 370 µm and then unloaded. At an average bead pressure unloading of 1.65 Mpa, the metal bead 610 exhibited a pressure of 0.96 MPa at position 611, a pressure of 2.51 MPa at position 613, and the total pressure profile of metal bead 610 had a range of 1.55 MPa. These results show that varying the height of the metal bead 610 improves the pressure profile uniformity thereof While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for designing a half plate of a fuel cell, the method comprising:
providing a half plate defining a metal bead;
determining a pressure profile of the metal bead in a compressed state; and
adjusting a height of the metal bead in one or more locations to increase the uniformity of the metal bead pressure profile.

2. The method of claim 1, wherein the pressure profile of the metal bead comprises a plurality of pressure measurements taken at different locations of the metal bead while in the compressed state.

3. The method of claim 2, wherein increasing the uniformity of the metal bead pressure profile comprises reducing a range of the plurality of pressure measurements.

4. The method of claim 1, wherein the compressed state of the metal bead is achieved via mechanical compression of the metal bead.

5. The method of claim 1, wherein the compressed state of the metal bead is achieved via a finite element analysis simulation.

6. The method of claim 1, wherein increasing the uniformity of the metal bead pressure profile comprises reducing the height of the metal bead in locations which exhibited higher pressures in the compressed state relative to a mean pressure of the pressure profile, and/or increasing the height of the metal bead in locations which exhibited lower pressures in the compressed state relative to the mean pressure of the pressure profile.

7. The method of claim 1, wherein after adjusting the height of the metal bead in one or more locations to increase the uniformity of the metal bead pressure profile, the height of the metal bead in at least one region thereof varies from an average height of the metal bead by at least about 2%.

8. A method for designing a pair of half plates of a fuel cell, the method comprising:

providing a first half plate defining a first half plate metal bead, wherein the first half plate metal bead protrudes from the first half plate forming a convex side;

providing a second half plate defining a second plate metal bead, wherein the second half plate metal bead protrudes from the second half plate forming a convex side;

determining a pressure profile between the convex sides of the first half plate metal bead and the second half plate metal bead in a compressed state; and adjusting a height of the first half plate metal bead and/or the second half plate metal bead in one or more locations to increase the uniformity of the pressure profile.

9. The method of claim 8, wherein the pressure profile comprises a plurality of pressure measurements taken between the convex sides of the first half plate metal bead and the second half plate metal bead at different locations while in the compressed state.

10. The method of claim 9, wherein increasing the uniformity of the pressure profile comprises reducing a range of the plurality of pressure measurements.

11. The method of claim 8, wherein the compressed state of the metal bead is achieved by compressing the first half plate and the second half plate such that the convex sides of the first half plate metal bead and the second half plate metal bead are mated.

12. The method of claim 8, wherein the compressed state of the metal bead is achieved via a finite element analysis simulation.

13. The method of claim 8, wherein increasing the uniformity of the pressure profile comprises reducing the height of the first half plate metal bead and/or the second half plate metal bead in locations which exhibited higher pressures in the compressed state relative to a mean pressure of the pressure profile, and/or increasing the height of the first half plate metal bead and/or the second half plate metal bead in locations which exhibited lower pressures in the compressed state relative to the mean pressure of the pressure profile.

14. The method of claim 8, wherein after adjusting the height of the first half plate metal bead and/or the second half plate metal bead in one or more locations to increase the uniformity of the pressure profile, the height of the metal bead in at least one region thereof varies from an average height of each respective metal bead by at least about 2%.

* * * * *